(12) United States Patent
McCullough

(10) Patent No.: US 6,932,419 B1
(45) Date of Patent: Aug. 23, 2005

(54) AERODYNAMIC GUIDING ARRANGEMENTS FOR VEHICLES

(76) Inventor: William McCullough, 170 Sunset Dr., Leesburg, FL (US) 34748

(*) Notice: Subject to any disclaimer, the term of this patent is extended or adjusted under 35 U.S.C. 154(b) by 0 days.

(21) Appl. No.: 11/048,902

(22) Filed: Feb. 3, 2005

(51) Int. Cl.⁷ .............................................. B60J 1/00
(52) U.S. Cl. ............................ 296/180.1; 296/180.2; 296/180.3
(58) Field of Search ................ 296/180.1, 180.2, 296/180.3, 180.4, 166; 105/1.1, 17; 180/903; 280/849

(56) References Cited

U.S. PATENT DOCUMENTS

| | | | | |
|---|---|---|---|---|
| 2,605,119 A | * | 7/1952 | Earnest ........................ | 280/849 |
| 2,793,597 A | * | 5/1957 | Walters ........................ | 105/17 |
| 3,834,752 A | * | 9/1974 | Cook et al. .................. | 105/1.1 |
| 3,944,017 A | | 3/1976 | Foster ......................... | 180/89.15 |
| 3,948,341 A | | 4/1976 | Foster ......................... | 180/89.15 |
| 3,958,659 A | | 5/1976 | Selman ....................... | 180/89.15 |
| 4,156,543 A | * | 5/1979 | Taylor et al. ................ | 296/180.3 |
| 4,372,411 A | | 2/1983 | Flower ....................... | 180/89.15 |
| 4,452,329 A | | 6/1984 | Stone et al. ................ | 180/89.15 |
| 4,483,409 A | | 11/1984 | Fun ........................... | 180/89.15 |
| 4,502,673 A | | 3/1985 | Clark ......................... | 267/64.24 |
| 4,506,751 A | | 3/1985 | Stephens .................... | 180/89.15 |
| 4,509,786 A | * | 4/1985 | Gregg ......................... | 296/180.3 |
| 4,513,845 A | | 4/1985 | Stephens et al. ........... | 188/299.1 |
| 4,518,188 A | * | 5/1985 | Witten ........................ | 296/180.3 |
| 4,601,508 A | * | 7/1986 | Kerian ........................ | 296/180.4 |
| 4,735,272 A | | 4/1988 | Sjöström et al. ........... | 180/89.14 |
| 4,775,179 A | * | 10/1988 | Riggs ......................... | 296/180.2 |
| 4,779,915 A | * | 10/1988 | Straight ...................... | 296/180.3 |
| 4,824,165 A | * | 4/1989 | Fry ............................. | 296/180.3 |
| 4,904,015 A | * | 2/1990 | Haines ....................... | 296/180.3 |
| 5,078,448 A | * | 1/1992 | Selzer et al. ................ | 296/180.2 |
| 5,190,342 A | * | 3/1993 | Marlowe et al. ........... | 296/180.2 |
| 5,240,306 A | * | 8/1993 | Flemming .................. | 296/180.4 |
| 5,253,853 A | | 10/1993 | Conaway et al. ........... | 267/256 |
| 5,516,185 A | * | 5/1996 | O'Donnell et al. .......... | 296/166 |
| 5,623,410 A | | 4/1997 | Furihata et al. ............ | 701/37 |
| 5,921,617 A | * | 7/1999 | Loewen et al. ............. | 296/180.4 |
| 6,267,434 B1 | * | 7/2001 | Casillas ...................... | 296/180.1 |
| 6,428,084 B1 | * | 8/2002 | Liss ............................ | 296/180.1 |
| 6,585,312 B2 | * | 7/2003 | Jain ............................ | 296/180.1 |
| 6,846,035 B2 | * | 1/2005 | Wong et al. ................ | 296/180.1 |
| 2002/0135205 A1 | * | 9/2002 | Oliver ........................ | 296/180.1 |
| 2003/0030300 A1 | * | 2/2003 | Jain ............................ | 296/180.1 |
| 2004/0239146 A1 | * | 12/2004 | Ortega et al. .............. | 296/180.2 |
| 2005/0040668 A1 | * | 2/2005 | Wood ......................... | 296/180.1 |

FOREIGN PATENT DOCUMENTS

| | | |
|---|---|---|
| DE | 3 838 424 A1 | 5/1990 |
| GB | 2 033 851 A | 10/1979 |
| JP | 5-69860 A | 3/1993 |

* cited by examiner

Primary Examiner—Kiran B. Patel
(74) Attorney, Agent, or Firm—Richard C. Litman

(57) ABSTRACT

An aerodynamic guiding arrangement for a vehicle that includes a forward gap enclosure with an upper element and a lower element. The gap enclosure is configured to be positioned and attached proximate a forward end of the vehicle. The guiding arrangement includes a gap closure mechanism for automatically moving the forward gap enclosure from an open position to a closed position, and from a closed position to an open position, based on speed of the vehicle. Another aerodynamic guiding arrangement includes a windscreen with a top, a bottom, and a center of curvature. The windscreen curves smoothly rearward with increasing distance from a central plane, and has a reverse slope such that over a majority of the windscreen the top is farther from the center of curvature than the bottom.

9 Claims, 12 Drawing Sheets

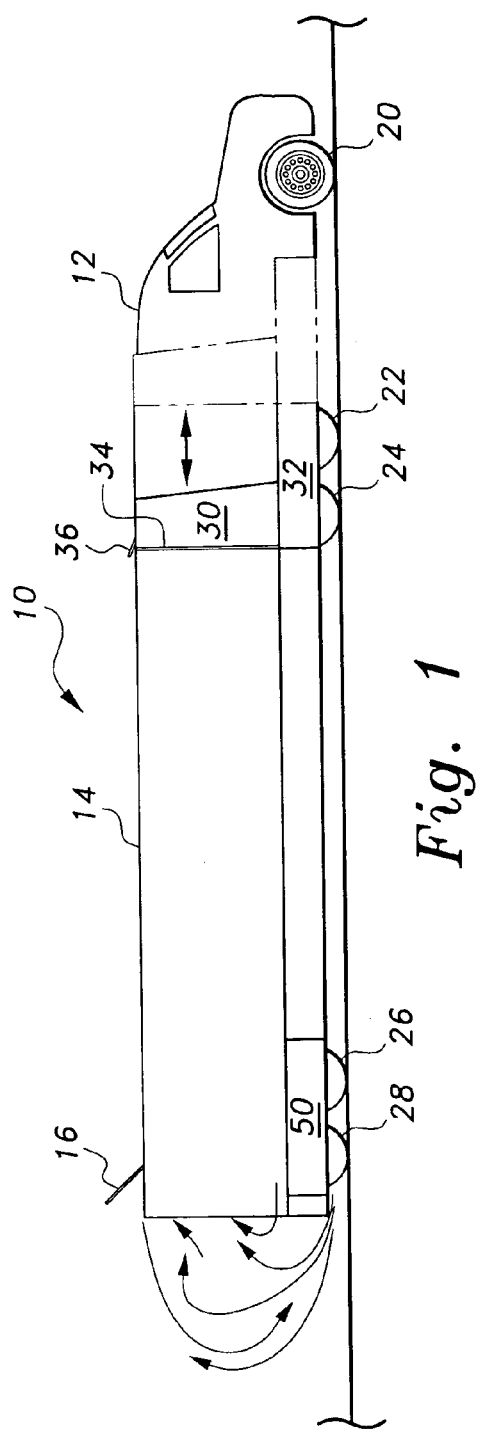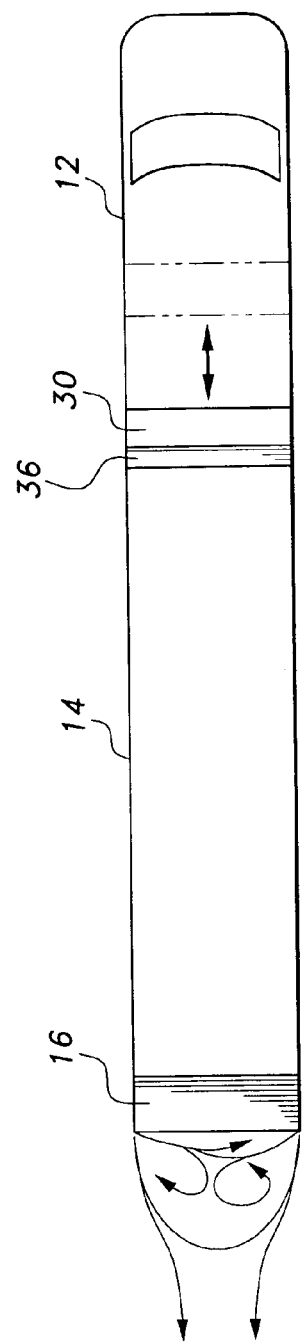

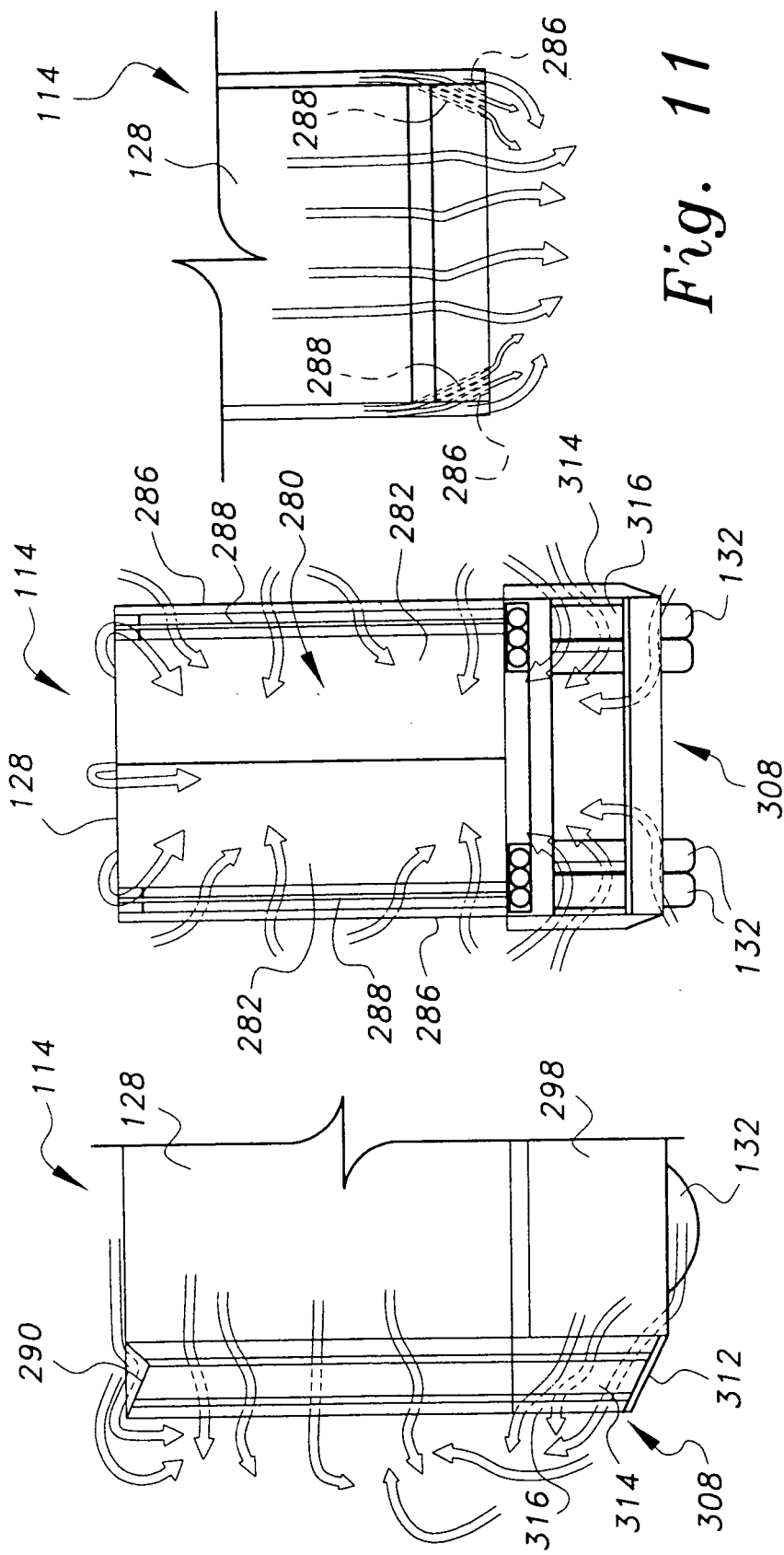

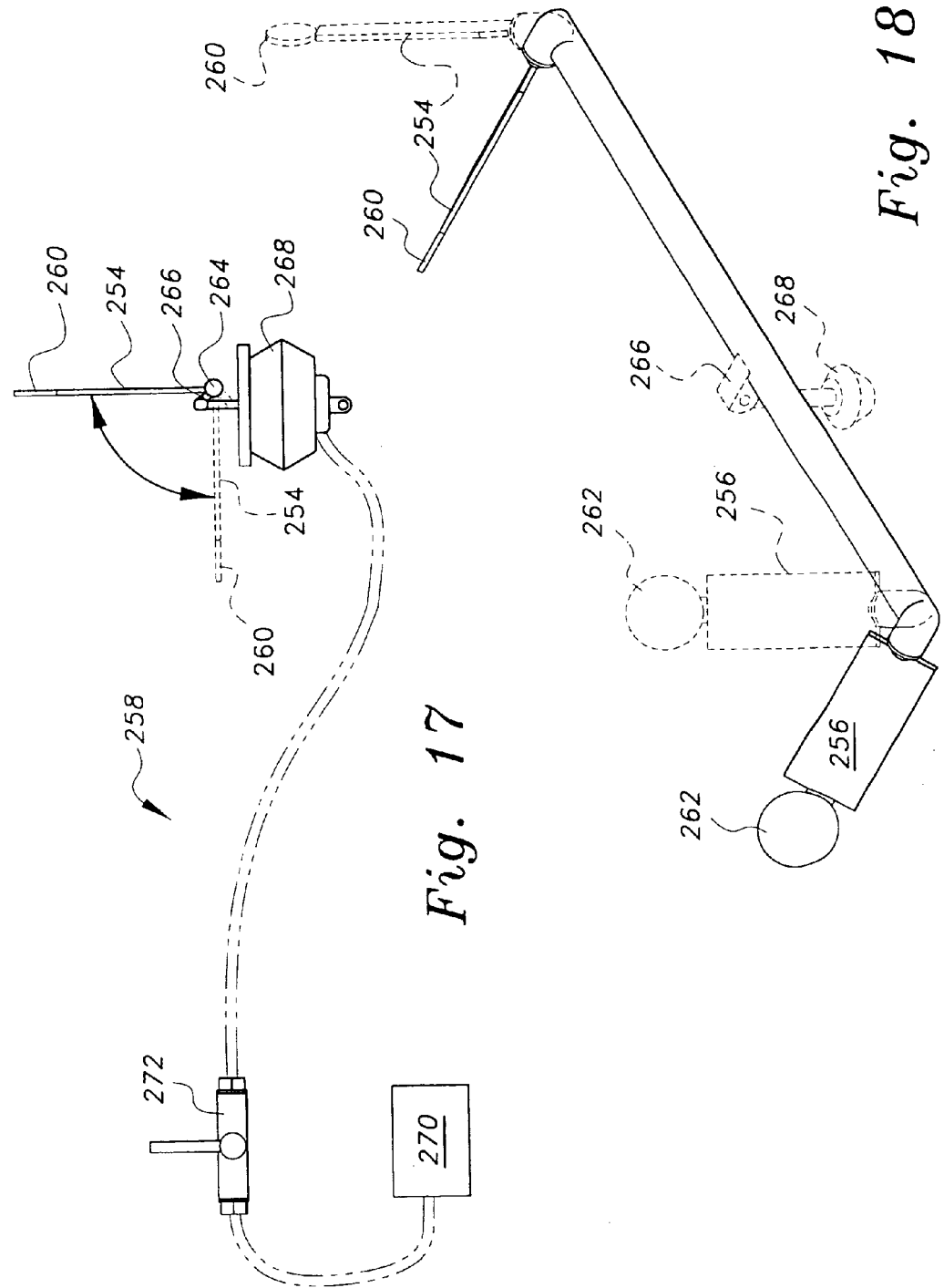

AERODYNAMIC GUIDING ARRANGEMENTS FOR VEHICLES

BACKGROUND OF THE INVENTION

1. Field of the Invention

The present invention generally relates to truck aerodynamics and, more particularly to aerodynamic guiding arrangements for vehicles.

2. Description of Related Art

Long-haul trucks transport a substantial portion of the goods purchased or used, by consumers and industry alike, in many countries. Therefore, long-haul trucking is of vital importance to many national economies. The cost of transporting goods is reflected in the cost of the good to the ultimate consumer of that good. The overall cost of transporting goods by truck includes, among other costs, the driver's wage which is directly proportional to the time that each trip takes, the losses due to accidents attributable to driver fatigue which are reflected in the insurance premiums paid by truck operators, and the cost of fuel which is consumed in transporting a particular good. Advances in truck design which decrease travel time, reduce driver fatigue, or reduce truck fuel consumption are therefore highly desirable because such advances would reduce the ultimate cost of goods and increase the productivity of truck drivers and truck fleets.

Several aspects of truck design have a direct bearing on the factors affecting the trucking costs that were discussed previously. For example, improving the aerodynamic efficiency of the truck exterior would reduce the truck's fuel consumption. Improving the ergonomic design of the truck driver's surroundings and improving the comfort level of the truck driver, by isolating the driver from the harsh jolts imparted to the truck's chassis, would reduce driver fatigue and the costs associated with accidents attributable to driver fatigue. There have been continuing efforts to improve truck design in all the various aspects that have been discussed above.

Therefore, a need exists for aerodynamic guiding arrangements for vehicles to enhance the aerodynamic efficiency of vehicles, such as tractors and trailers or the like.

SUMMARY OF THE INVENTION

The present invention is directed to aerodynamic guiding arrangements for vehicles. One aerodynamic guiding arrangement includes a forward gap enclosure with an upper element and a lower element. The gap enclosure is configured to be positioned and attached proximate a forward end of the vehicle. The guiding arrangement includes a gap closure mechanism for automatically moving the forward gap enclosure from an open position to a closed position, and from a closed position to an open position, based on speed of the vehicle. Another aerodynamic guiding arrangement includes a windscreen with a top, a bottom, and a center of curvature. The windscreen curves smoothly rearward with increasing distance from a central plane, and has a reverse slope such that over a majority of the windscreen the top is farther from the center of curvature than the bottom.

BRIEF DESCRIPTION OF THE DRAWINGS

FIG. 1 is a side view of a tractor and trailer rig equipped with aerodynamic guiding arrangements according to the present invention.

FIG. 2 is a top view of is a side view of the tractor and trailer rig shown in FIG. 1.

FIG. 9 is a partial side view of the rear of the tractor and trailer rig shown in FIG. 7.

FIG. 10 is a rear view of the tractor and trailer rig shown in FIG. 7.

FIG. 11 is a partial top view of the rear of the tractor and trailer rig shown in FIG. 7.

FIG. 17 is a schematic view of a pneumatic actuation system used to pivot side view mirrors of the tractor and trailer rig shown in FIG. 7.

FIG. 18 is an isolated perspective view of a rotating bar which supports pivoting side view mirrors of the tractor and trailer rig shown in FIG. 7.

Similar reference characters denote corresponding features consistently throughout the attached drawings.

DETAILED DESCRIPTION OF THE PREFERRED EMBODIMENTS

Figure 3:
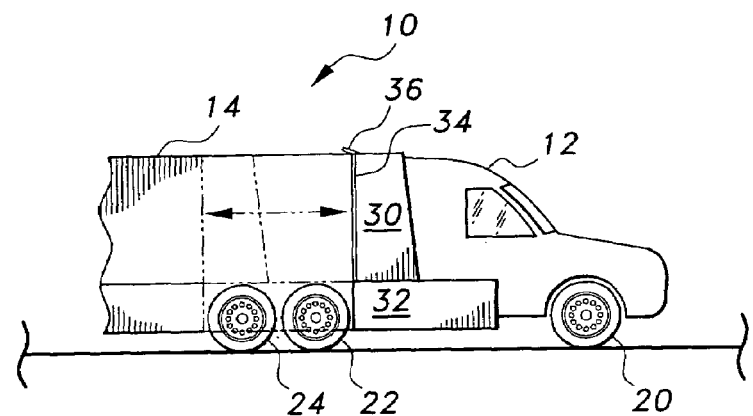
FIG. 3 is a partial side view of the front of the tractor and trailer rig shown in FIG. 1.
Figure 4:
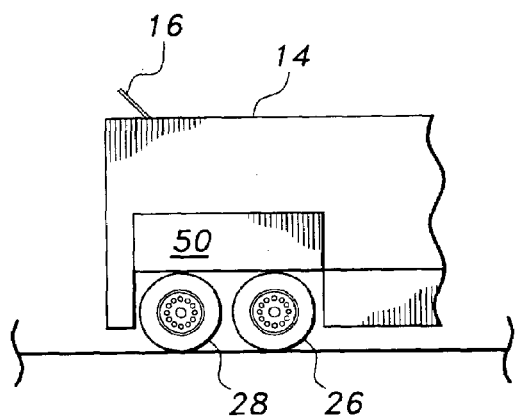
FIG. 4 is a partial side view of the rear of the tractor and trailer rig shown in FIG. 1.
Figure 5:
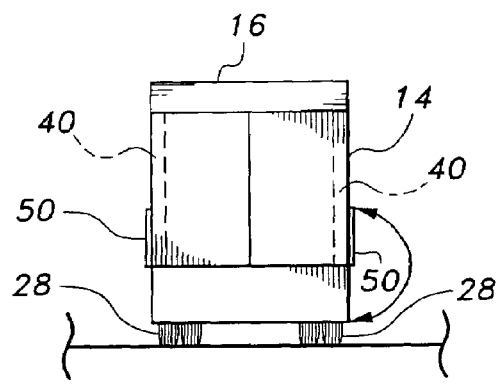
FIG. 5 is a rear view of the tractor and trailer rig shown in FIG. 1.

The present invention is aerodynamic guiding arrangements for vehicles. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Referring to the drawings, FIGS. 1–5 show a tractor and trailer rig 10 equipped with aerodynamic guiding arrangements according to the present invention. While the vehicles described throughout this application are tractors and trailers, the aerodynamic guiding arrangements may be configured for any type of vehicle, such as trains, buses, vans, boats, planes, etc. The tractor and trailer rig 10 includes a tractor 12 which is used to tow a trailer 14. The tractor 12 has a frame which supports an engine (not shown), a cab, and a fifth wheel. The front axle and one or two rear axles can be suspended, by leaf springs, air springs, etc., from the frame.

The tractor 12 has two rear axles, but the principles of the present invention are equally applicable to tractors or trucks with any number of rear axles. The tractor 12 is supported above a supporting surface, such as the ground or a road surface, by a plurality of wheels 22, 24, and 26. The front axle supports a pair of front wheels 22 at each end of the front axle. Eight rear wheels 24 and 26 are supported at each end of the forward rear axle, and a pair of wheels 26 are provided at each end of the rearmost axle. A propeller shaft (not shown) transmits power from the engine to the rear wheels 24 and 26.

An aerodynamic guiding arrangement in the form of a gap enclosure with an upper element 30 and a lower element 32 is positioned proximate the forward end of the tractor and trailer rig 10. The upper element 30 of the gap enclosure extends from approximately the height of the inflated front wheels 22 and 24 to the top of the trailer 14 and wraps about the top of the trailer 14 to approximately the height of the inflated front wheels 22 and 24 on the opposite side of the tractor and trailer rig 10. A rubber extrusion 34 having a predetermined width, such as eight inches or the like, extends along the full length of the upper element 30. A spoiler 36 may also be provided along the top and/or sides of the upper element 30 to enhance aerodynamic efficiency of the tractor and trailer rig 10. The lower element 32 of the gap enclosure is configured to cover the front wheels 22 and 24 when the tractor and trailer rig exceeds predetermined speed, such as a speed greater than about fifteen miles per hour or the like. The upper and lower elements 30 and 32 of the gap enclosure can be made of durable material, such as aluminum monocoque structure sheet and post, a fiberglass one-piece unit, a heat molded composite, or the like.

Figure 6:
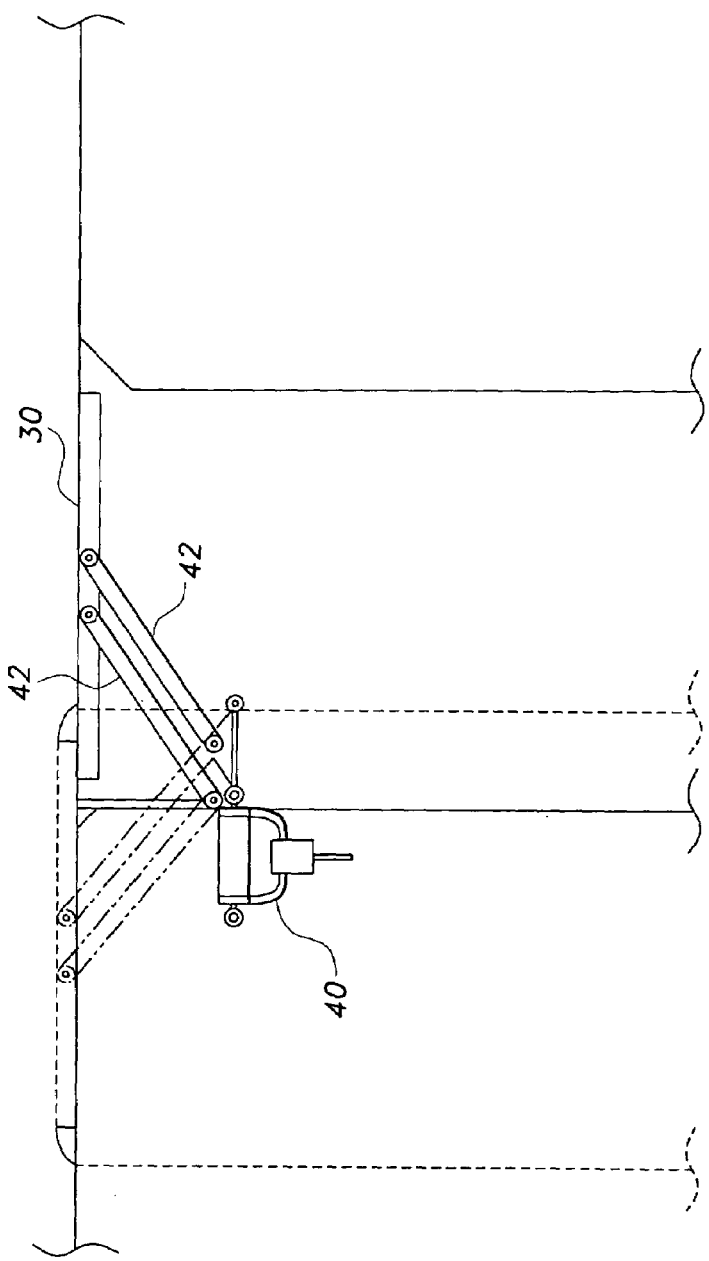
FIG. 6 is a partial cross sectional top view of the tractor and trailer rig shown in FIG. 1.
Figure 7:
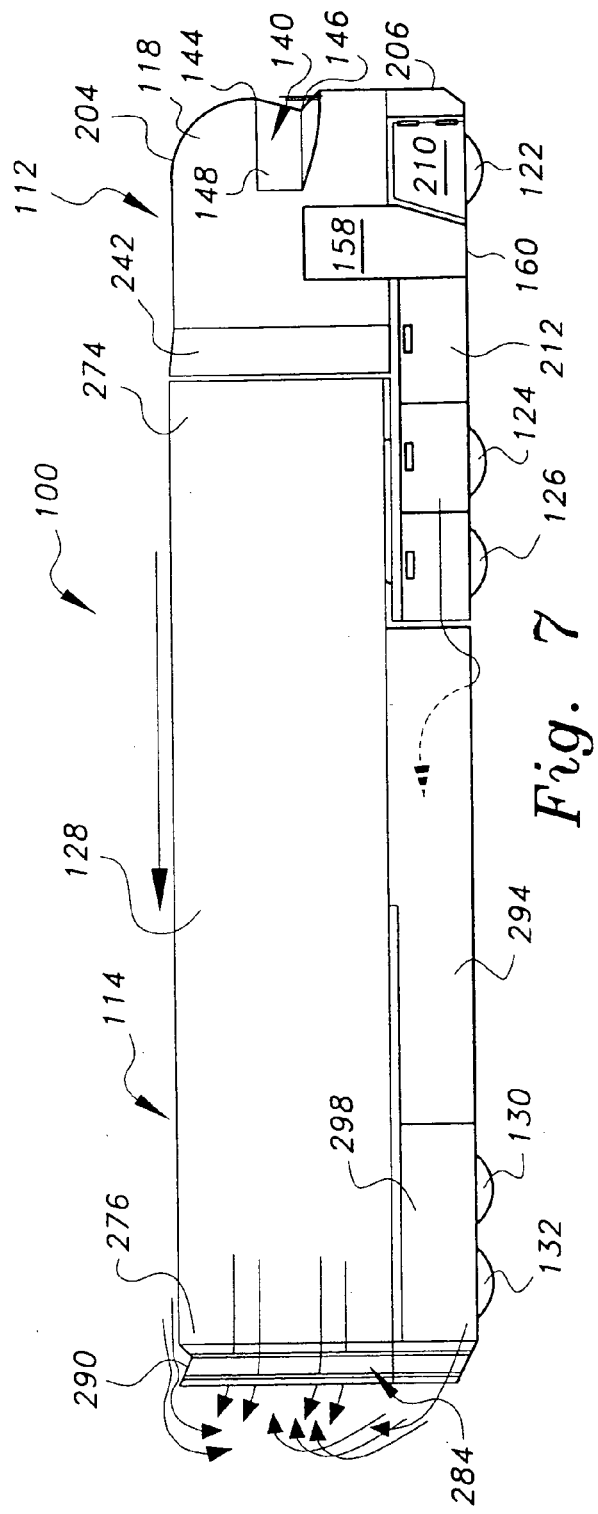
FIG. 7 is a side view of a tractor and trailer rig according to the present invention.

The gap enclosure moves from an open position, as shown in FIG. 3, to a closed position, as shown in FIG. 1, when the speed of the tractor and trailer rig exceeds a predetermined speed by a gap closure mechanism (see FIG. 6). The gap closure mechanism is attached to the upper gap closure element and includes pivoting arms 42 and an arrangement 40 including a smart valve attached to two solenoid valves. One of the solenoid valves opens an air valve that closes the gap enclosure when the tractor and trailer rig 10 exceeds a predetermined speed.

When the tractor and trailer rig 10 exceeds the predetermined speed, the rubber extrusion 34 is forced down on the sides and on the top of the trailer 14 by the passing air and enhances the aerodynamic efficiency of the tractor and trailer rig 10. The other valve opens the gap when the tractor and trailer rig 10 obtains a speed below the predetermined speed. The gap enclosure opens and closes automatically based on the speed of the tractor and trailer rig 10.

An aerodynamic guiding arrangement in the form of a gap enclosure with a pivotal element 50 is positioned proximate the rearward end of the tractor and trailer rig 10. The pivotal element 50 of this gap enclosure is configured to cover the rear wheels 26 and 28 when the tractor and trailer rig exceeds a predetermined speed, such as a speed greater than about fifteen miles per hour or the like. The trailer 14 can also be provided with a spoiler 16 along the top of the trailer 14 proximate the rearward end of the tractor and trailer rig 10 to enhance the aerodynamic efficiency of the tractor and trailer rig 10. Scoop spoilers 40 can also be built into the rear doors of the trailer 14 to further enhance the aerodynamic efficiency of the tractor and trailer rig 10 (see FIG. 5). When the tractor and trailer rig 10 is below the predetermined speed, the pivotal element 50 is positioned above the rear wheels 26 and 28. When the tractor and trailer rig 10 exceeds the predetermined speed, the pivotal element 50 pivots downward to cover the rear wheels 26 and 28.

Aerodynamic guiding arrangements for a tractor and trailer rig 100 are shown in FIGS. 7–18. The tractor-trailer 100 includes a tractor 112 which is used to tow a trailer 114. The tractor 112 has a frame 116 which supports an engine (not shown), a cab 118, and a fifth wheel 120. It is conventional for a front axle and one or two rear axles to be suspended, usually by leaf springs or air springs, from the frame 116. The tractor 112 has two rear axles, but the principles of the present invention are equally applicable to tractors or trucks with any number of rear axles. The tractor 112 is supported above a supporting surface, such as the ground or a road surface, by a plurality of wheels 122, 124, and 126. Usually, there is a pair of front wheels 122 with one wheel being supported at each end of the front axle, and there are eight rear wheels 124 and 126 with a pair of wheels 124 supported at each end of the forward rear axle, and a pair of wheels 126 being provided at each end of the rearmost axle. A propeller shaft (not shown) transmits power from the engine to the rear wheels 124 and 126.

The trailer 114 has a frame which supports a cargo housing 128, however, the cargo housing 128 itself may act as load bearing frame or part of the frame as desired. The cargo housing 128 is in the shape of an elongated rectangular parallelepiped. The rear of the trailer 114 is supported by eight wheels 130 and 132 mounted on two axles, although a single axle supported by four wheels may also be used for lighter trailers. The axles are suspended from the trailer 114 or the trailer frame using leaf springs or air springs in a manner similar to the axles of the tractor 112. The forward or front end of the trailer 114 is supported by a retractable jack stand when the trailer 114 is not hitched to the tractor 112.

A king pin projects from the bottom of the front portion of the trailer 114 which is engaged by the fifth wheel 120 to attach the trailer 114 to the tractor 112. The kingpin and the fifth wheel 120 together form a means for releasably attaching the trailer 114 to the tractor or towing vehicle 112. Once the trailer 114 is attached to the tractor 112, the tractor 112 can provide the motive force for towing the trailer 114, and the cargo inside the trailer, over long distances.

Figure 14:
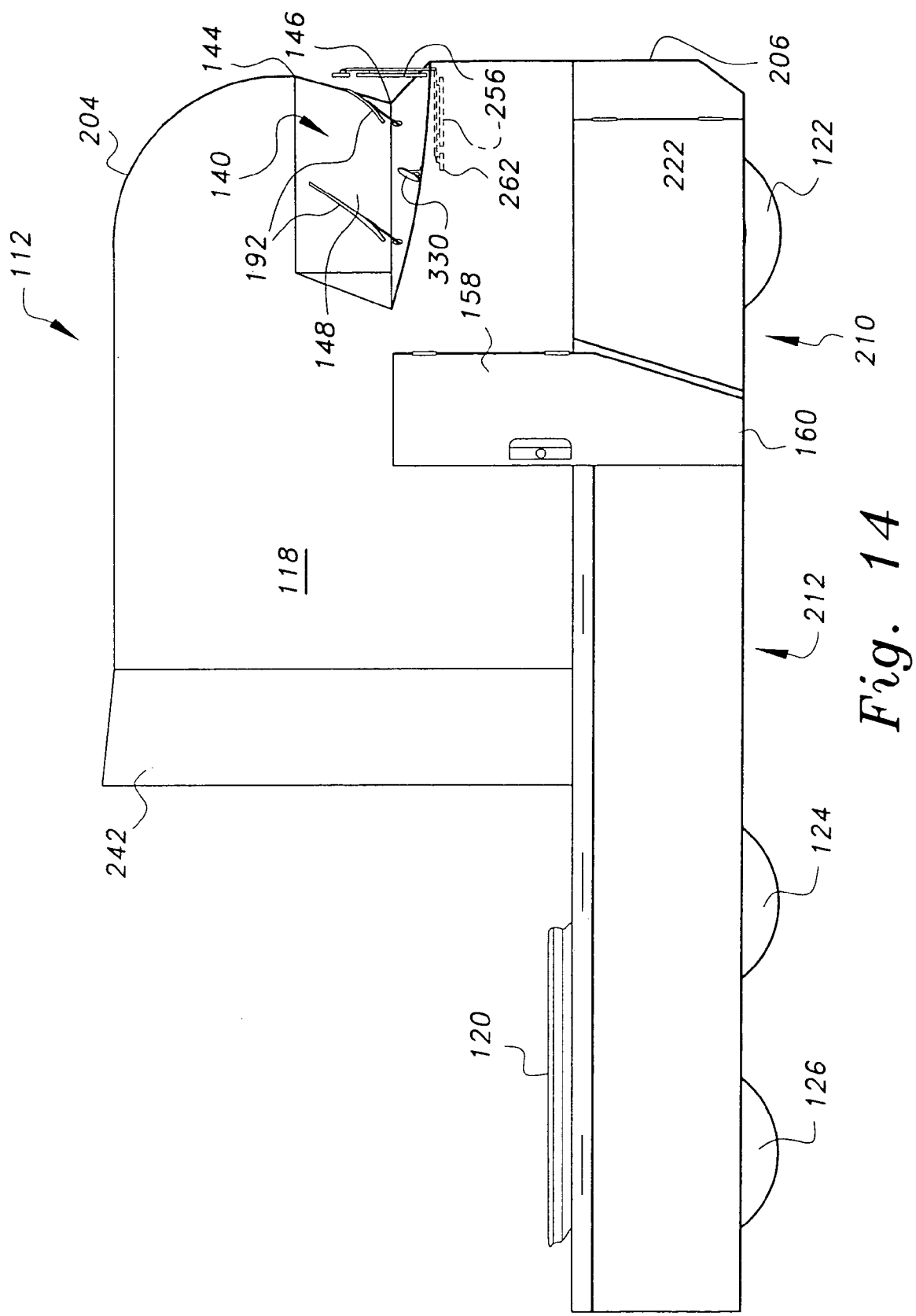
FIG. 14 is a side view of the tractor of the tractor and trailer rig shown in FIG. 7.
Figure 16:
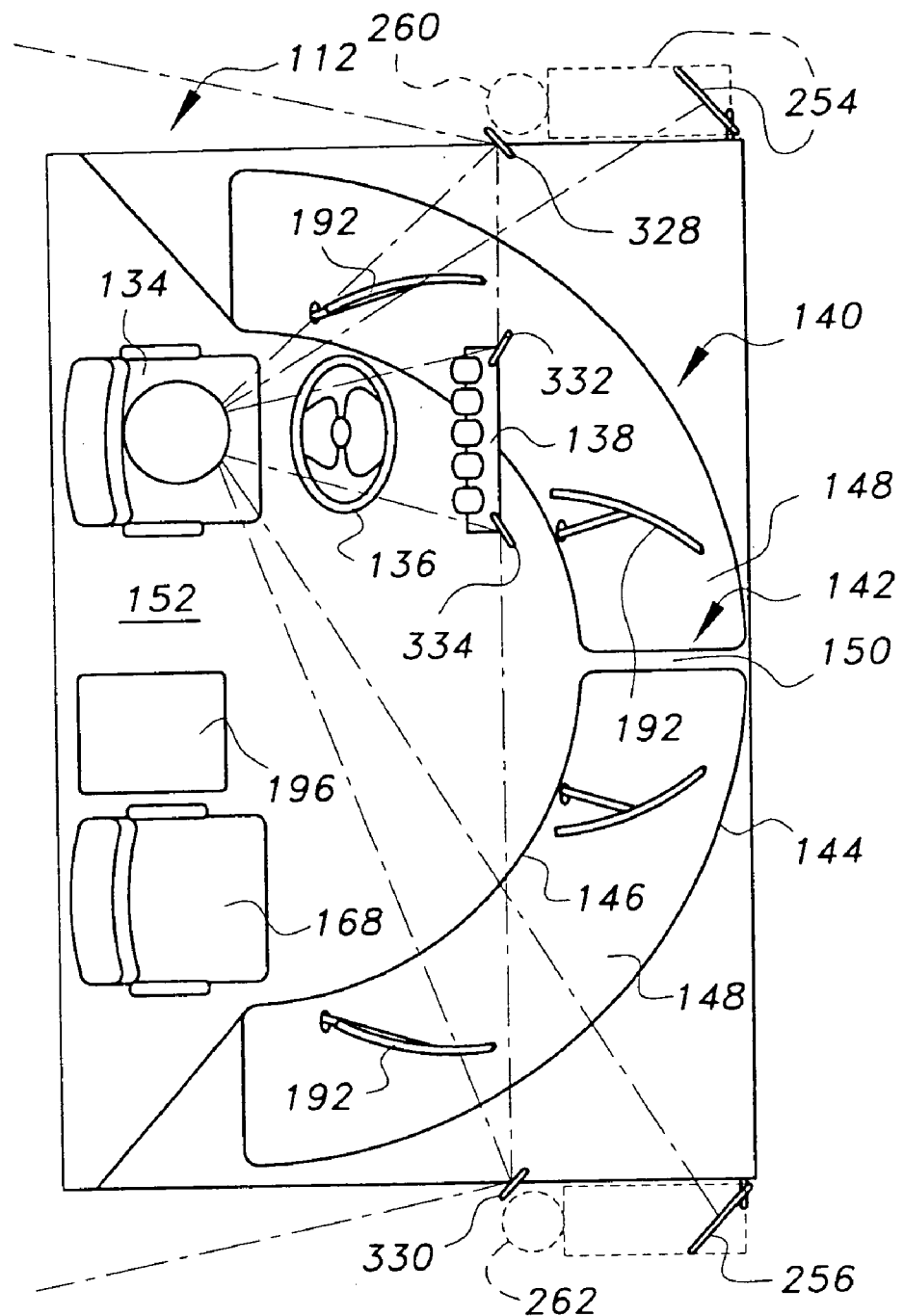
FIG. 16 is a plan view of the interior of the cab of the tractor of the tractor and trailer rig shown in FIG. 7.

The cab 118 has a windscreen 140 which is rounded so the windscreen 40 curves smoothly toward the rear of the cab 118 on either side of the windscreen 140, and follows a generally semicircular arc (see FIGS. 14 and 16). The rounded windscreen 140 allows for a more streamlined flow of air around the upper part of the cab 118 as the tractor moves forward through the air. Thus, the rounded windscreen 140 results in less drag on the truck cab 118 as compared to a truck cab having a flat windscreen which would present a rectangular front end to the air rushing around such a truck cab.

The windscreen 40 has a center of curvature located inside the cab 118 along the central plane of the tractor 112. The windscreen 140 has a reverse slope such that over a majority of the extent of the windscreen 140, the top 144 of the windscreen 140 is farther from the center of curvature of the windscreen 140 as compared to the bottom 146 of the windscreen 140. Thus, the top 144 of the windscreen projects farther forward than the bottom 146 of the windscreen 140, and in general the top 144 of the windscreen 140 overhangs the bottom 146 of the windscreen 140. This overhanging windscreen design is extremely efficient in shedding rain, and this windscreen 140 provides the driver with a more commanding view of the area immediately in front of the tractor cab 118.

The windscreen 140 has two transparent sections 148 separated by a middle windscreen frame member 150. Each of the transparent sections 148 is wiped by a pair of windscreen wipers 192 whose action is greatly aided by the overhanging windscreen design. The sections 148 are identical to one another, they generally follow circular arcs, and each section 148 is symmetrical about a radially extending plane which bisects the section 148. As used herein, "radially extending" means that the plane extends along a radius of the arc followed by the transparent sections 148. This design allows a single form or geometry to be used for both transparent sections 148 of the windscreen 140, which greatly simplifies manufacturing and reduces tooling and production costs.

The exterior surface 204 of the roof of the cab 118 curves smoothly upward and rearward in a streamlined manner from the top of the windscreen 140 to a maximum height at or near the rear of the cab 118, which is approximately equal to the maximum height of the trailer 114. Thus, a streamlined surface is presented to the air flowing past the tractor 112 instead of the squared-off upper portion of the front of the trailer cargo housing 128 in order to further reduce drag.

A front fairing 206 covers and streamlines the front of the tractor 112 below the cab 118. The front fairing 206 also acts as a front bumper for the tractor 112. A first skirt 208 covers the right side of the tractor 112 to include the gas tank 220. The first skirt 208 can be slid back to cover the wheels 124 and 126. A second skirt 210 covers the right side of the tractor 112 extending across the front right tire 122. A third skirt 212 covers the right side of the tractor 112 extending over the rearmost tires 130 and 132 to the rear end of the trailer.

Referring to FIGS. 7, 13A, 13B, and 14, the first skirt 208 is slidably movable to expose the right rear wheels 124 and 126 for servicing and to expose the fuel tank 220 for the purpose of refueling. The first skirt 208 has a track 226 located along the top of the first skirt 208 and extending over at least the portion of the skirt 208 covering the gas tank 220 and the right rear wheels 124 and 126. The first skirt 208 has rollers 228 which are rotatably supported at the top of the skirt 208 and engage the track 226 and allow slidable movement of the skirt 208. There are also two separate rollers 230 and 232 and a cranked rod 234 (see FIGS. 13A and 13B).

The second skirt 210 has a movable panel 222 that is hingedly movable to expose the right front wheel 122 and allows access to the right front wheel 122 for servicing. The third skirt 298 is hingedly movable to allow access to the right rear wheels 130 and 132 for servicing. The skirts 208, 210, and 298 all have bottom edges that are located at a height above the supporting surface so when the plurality of wheels 22, 24, 26, 30 and 132 are at the limit of their travel nearest the frame 16, the skirts 208, 210, and 298 do not contact the supporting surface, e.g. the ground.

Skirt 212 is a mirror image of skirt 208 and is therefore not discussed in detail. By completely enclosing the frontal arc and sides of the tractor 112 with skirts, the tractor 112 is provided with a relatively lower drag coefficient while still allowing for access to the wheels for servicing, e.g. inflating, fixing a flat, etc., and to the fuel tank 220 for refueling. Skirts 210, 298 covering the wheels 122, 130, 132 are provided with releasable latch mechanisms of well-known design to keep the panels in the closed position until the operator manipulates the latch mechanisms to selectively open the movable panel of skirt 208.

The tractor 112 further includes a pair of flaps 240 and 242. The first flap 240 is supported on the left side of the tractor. The first flap 240 is movable between a first position and a second position. The first flap 240 substantially covers the gap between the cab 118 and the cargo housing 128 on the left side of the tractor 112 when the tractor is towing the trailer 114 and the first flap 240 is in the first position thereof. The first flap 240 lies alongside the cab 118 when the first flap 240 is in the second position thereof which is similar to the second position shown for the second flap 242 in FIG. 15.

A first actuating means moves the first flap 240 from the second position thereof to the first position thereof when the tractor 112 is traveling at a speed equal to or greater than a predetermined speed. The first actuating means moves the first flap 240 back to the second position when the speed of the tractor and trailer rig 100 drops below a predetermined speed. The first actuating means is not presented here because it is a mirror image of the actuating means which moves the second flap 242 and which is discussed in greater detail below.

Figure 8:
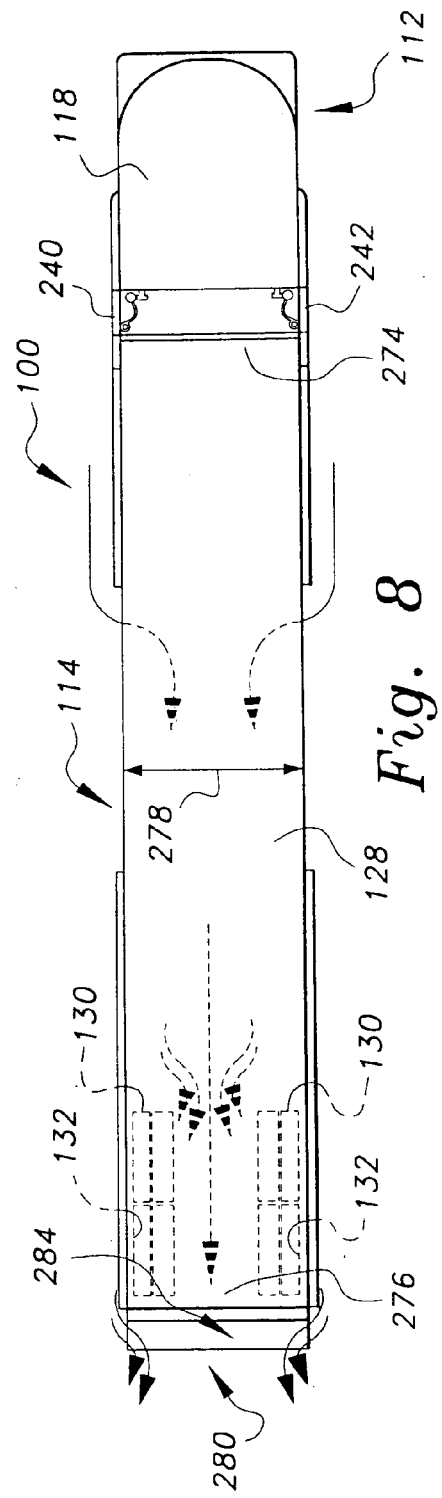
FIG. 8 is a top view of the tractor and trailer rig shown in FIG. 7.
Figure 12:
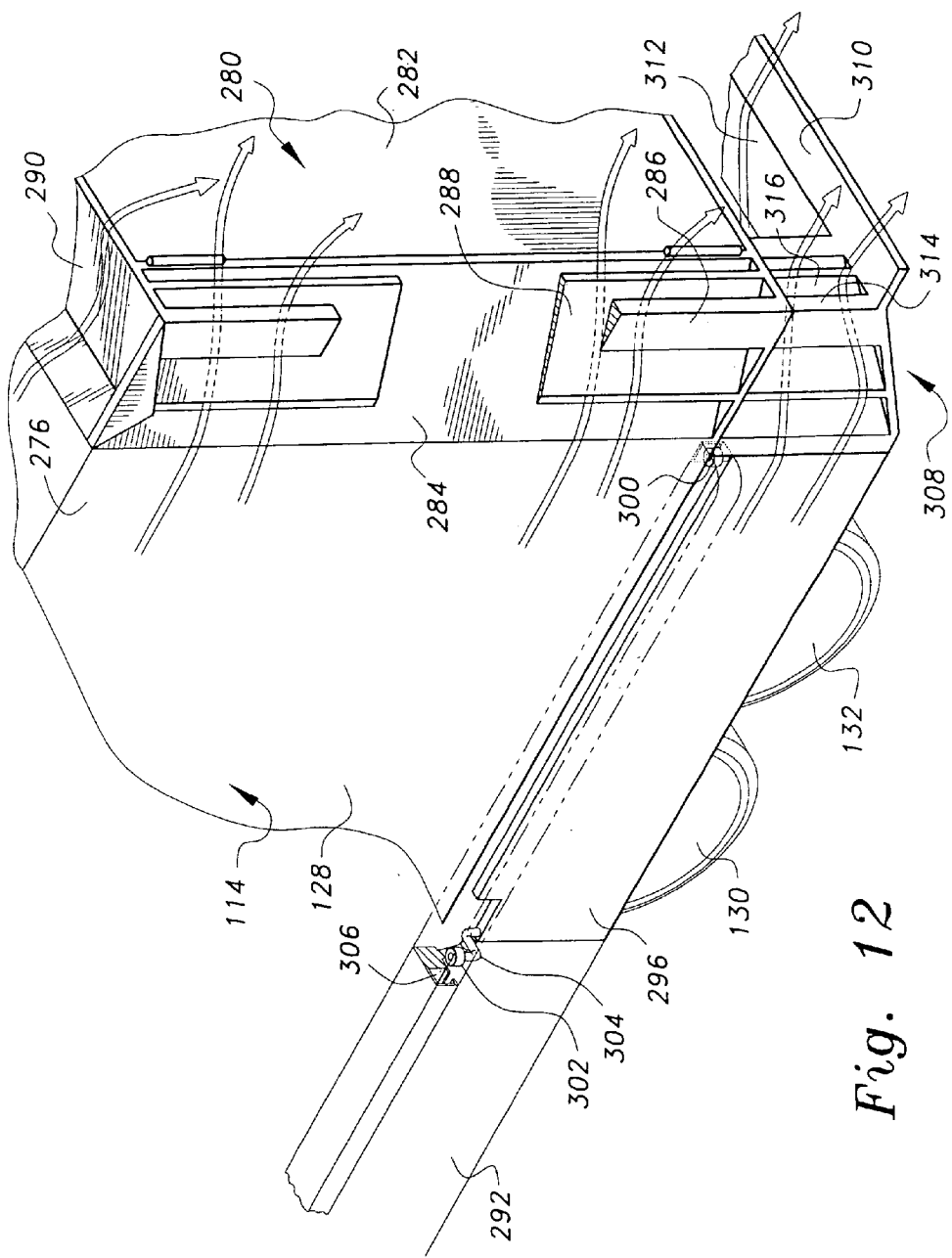
FIG. 12 is a fragmentary perspective view of the rear of the tractor and trailer rig shown in FIG. 7.
Figure 13A:
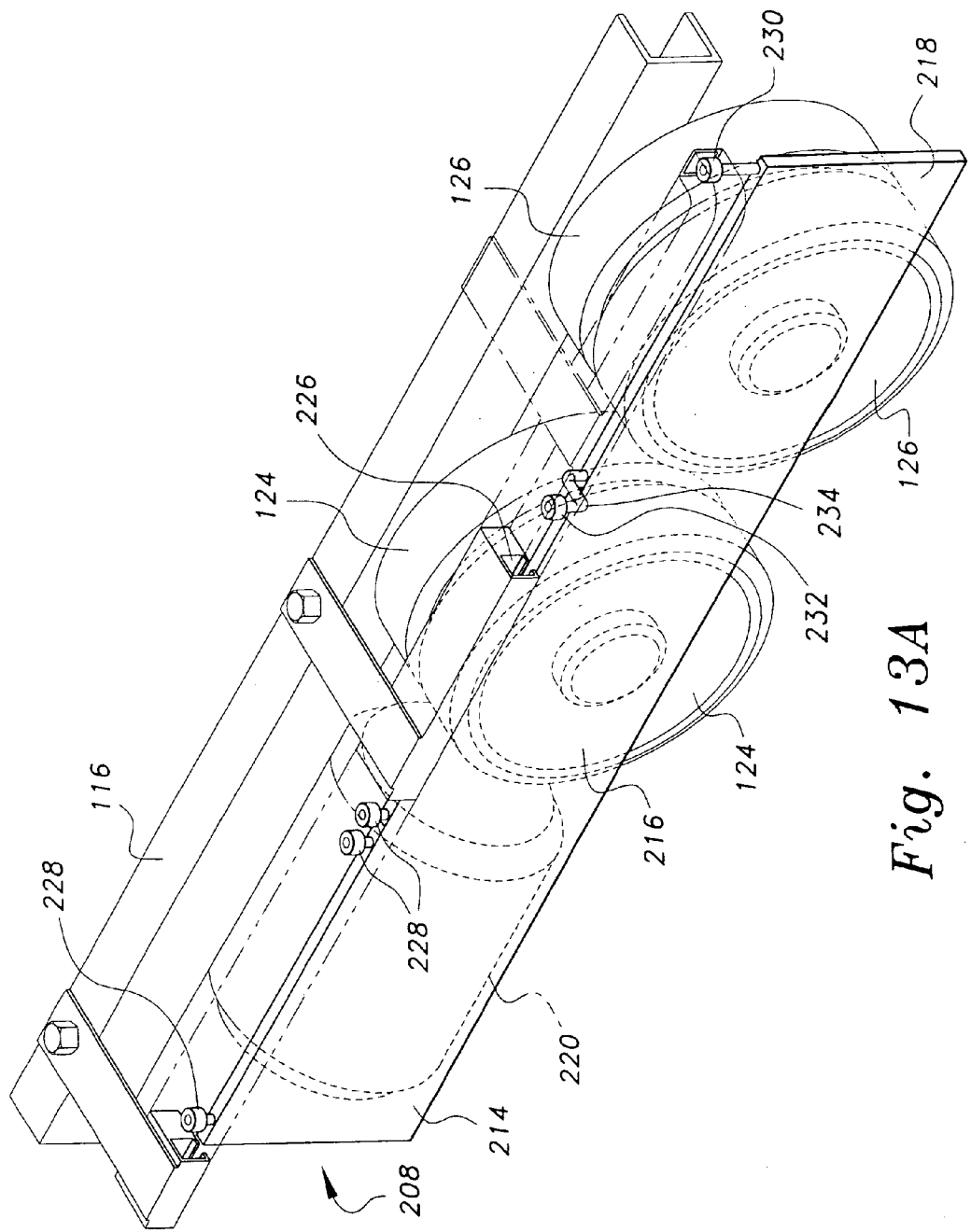
FIG. 13A is a fragmentary perspective view of slidably movable panels in an open position of a side skirt of the tractor and trailer rig shown in FIG. 7.
Figure 13B:
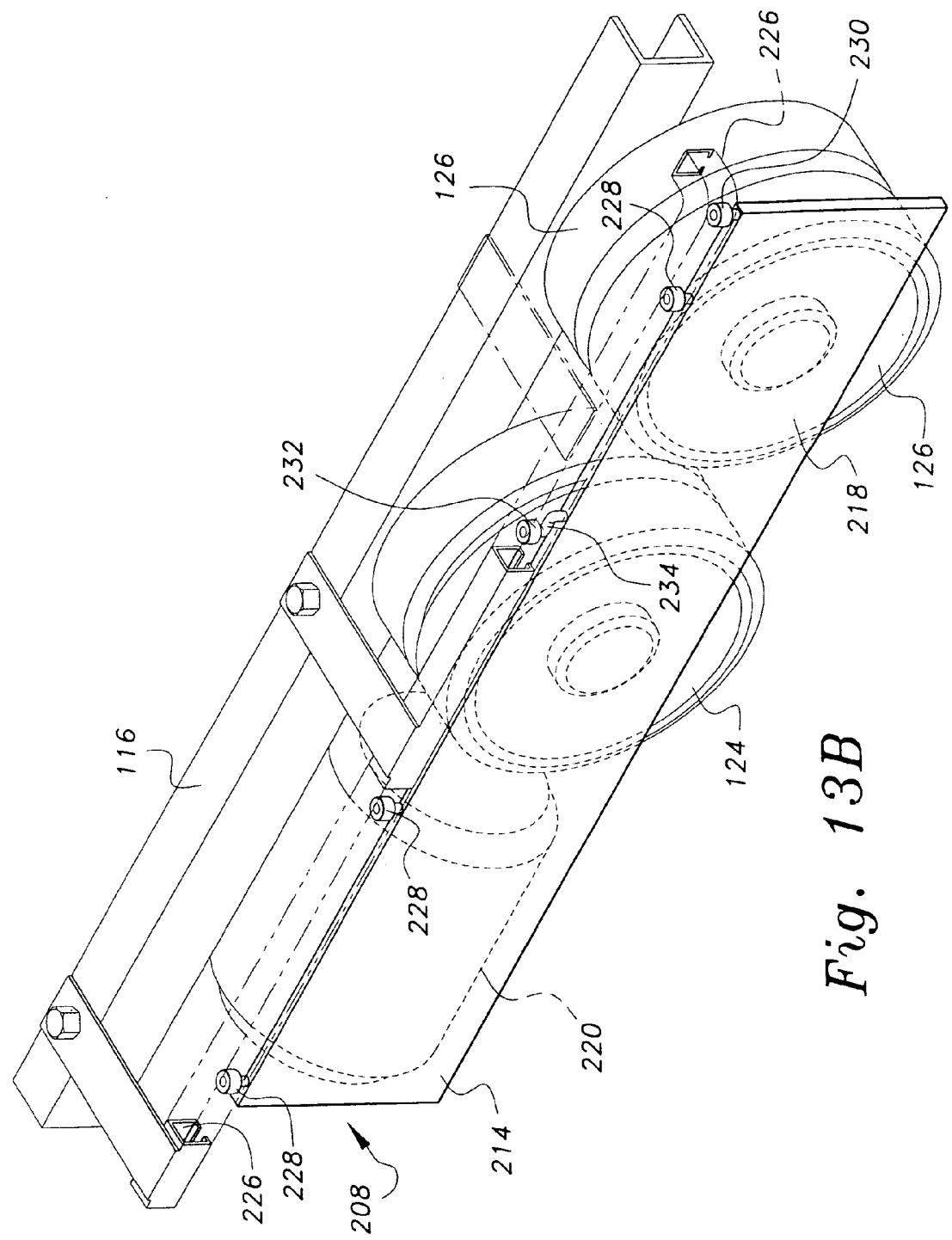
FIG. 13B is a fragmentary perspective view of slidably movable panels in a closed position of the side skirt of the tractor and trailer rig shown in FIG. 7.
Figure 15:
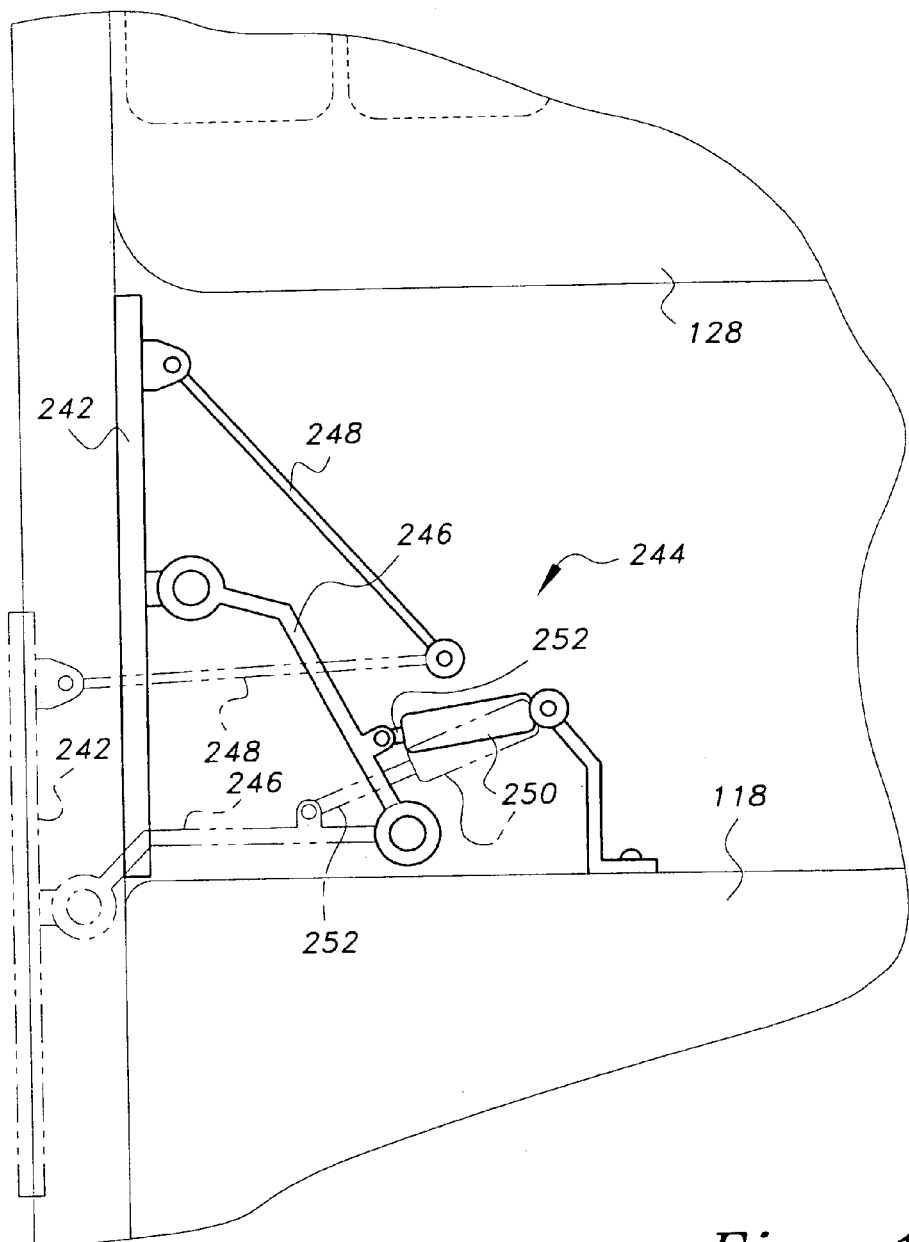
FIG. 15 is a fragmentary view of an actuating mechanism for side flaps of the tractor and trailer rig shown in FIG. 7.

Referring to FIGS. 8 and 15, a second flap 242 is supported on the right side of the tractor 112. The second flap 242 is movable between a first position and a second position. The second flap 242 substantially covers the gap between the cab 118 and the cargo housing 128 of the trailer 114 on the right side of the tractor 112 when the tractor 112 is towing the trailer 114 and the second flap 242 is in the first position. The second flap 242 lies alongside the cab 118, a shown in FIG. 15, when the second flap 242 is in the second position. A second actuating means 244 moves the second flap 242 from the second position to the first position when the tractor 112 is traveling at a speed equal to or greater than the predetermined speed mentioned above. For example, consider the predetermined speed being thirty five miles per hour. The second actuating means 244 moves the second flap 242 back to the second position when the speed of the rig 100 drops below the predetermined speed.

The second actuating mechanism 244 includes a bent rod 246, a straight rod 248, and a pneumatic cylinder 250. One end of the bent rod 246 is pivotally attached to the flap 242 and the other end of the bent rod 246 is pivotally supported about a pivot axis which is fixed relative to the cab 118. Similarly, one end of the straight rod 248 is pivotally attached to the flap 242 and the other end of the straight rod 248 is pivotally supported about a pivot axis which is fixed relative to the cab 118. The exposed end of the telescoping rod 252 of the pneumatic cylinder 250 is pivotally attached to the bent rod 246. The end of the pneumatic cylinder 250 opposite the end from which the telescoping rod 252 projects, is pivotally supported about a pivot axis which is fixed relative to the cab 118.

As the telescoping rod 252 extends, the bent rod 246 pivots outward and moves the flap 242 out of the gap between the cab 118 and the cargo housing 128. The straight rod 248 maintains the flap 242 in an orientation parallel to the side of the cab 118. As the telescoping rod 252 retracts, the bent rod 246 pivots back to its original position and moves the flap 242 back into the gap between the cab 118 and the cargo housing 128. The straight rod 248 again maintains the flap 242 in an orientation parallel to the side of the cab 118. Pressurized air can be supplied to the pneumatic cylinder 250 from the tractor's 112 compressed air system. The compressed air system is of a well-known type and most tractors are equipped with such a system. A microprocessor based system, receiving inputs from the tractor's speedometer, can be used to control the pneumatic cylinder 250 in response to the speed of the tractor 112.

Referring to FIGS. 14 and 16 to 18, the tractor 112 also has a pair of side view mirrors 254 and 256, with one being supported on each side of the cab 118. Each of the side view mirrors 254 and 256 is pivotally supported to be movable between a vertical position and a horizontal position. A third actuating means 258 moves the pair of side view mirrors 254 and 256 from the vertical position to the horizontal position when the tractor 112 is traveling at a speed equal to or greater than a predetermined speed, such as greater than fifteen miles per hour. When the speed of the tractor 112 drops below the predetermine speed, the actuating mechanism 258 moves the mirrors 254 and 256 back to the vertical position. A pair of round blind spot mirrors 260 and 262 are also provided, with each of the mirrors 260 and 262 being positioned atop a respective one of the mirrors 254 and 256.

The actuating mechanism 258 includes a pivoting bar 264 which extends through the width of the cab 118. Each of the mirrors 254 and 256 is supported at a respective end of the bar 264. An arm 266 projects perpendicularly from the bar 264. A pneumatic ram 268 is engaged to the end of the arm 266 distal from the bar 264. The pneumatic ram 268 is supplied with pressurized air from a pressurized air source 270, which may be the pneumatic system of the tractor 112 that has already been mentioned. As the pneumatic ram 268 extends, the bar 264 pivots and moves the mirrors 254 and 256 to the vertical position. As the pneumatic ram 268 retracts, the bar 264 pivots back to its original position and moves the mirrors 254 and 256 back to the horizontal position.

A microprocessor based system, receiving inputs from the tractor's speedometer, can be used to control the pneumatic ram 268 in response to the speed of the tractor 112. Alternatively, a manual valve 272, accessible by the driver within the cab 118, can be used by the driver to lower the mirrors to the horizontal position when the driver deems that the mirrors 254 and 256 are not needed. FIG. 16 also illustrates a driver's seat 134, a steering wheel 136, an instrument panel 138, an apex 142, a floor bottom 152, a small refrigerator 196, a passenger's seat 168 and windshield wipers 192.

When the main mirrors 254 and 256 are pivoted to the horizontal position, backup mirrors 328 and 330 can be used by the driver to monitor the presence of vehicles in adjacent lanes. Another pair of mirrors 332 and 334 are positioned on either side of the instrument panel 138. The driver can use the mirrors 332 and 334 to view the images in the mirrors 328 and 330, respectively, without taking his/her eyes off the road.

The trailer 114 includes a cargo housing 128 with a front end 274, a rear end 276, and a maximum width 178 (see FIGS. 7–12). The cargo housing 128 has a rear access 280 for loading and unloading the cargo housing 128. The rear access 280 is provided with a pair of hinged doors 282 or a sliding door. The doors 282 act as a closure for the cargo housing 128. The rear access 280 has a width less than the maximum width 278 of the cargo housing 128. The cargo housing 128 has a tapering width portion 284 adjacent the rear access 280 whose width tapers uniformly from about the maximum width of the cargo housing 128 to about the width of the rear access 280. The tapering rear end of the cargo housing 128 allows ambient air to more readily flow into the space immediately behind the rear access doors 282. Thus, the drag force due to suction created behind the rear end of the trailer 114, as the trailer 114 is being towed at speed, is reduced.

The trailer 114 can further be provided with louvers 286 and 288 at each side of the tapering width portion 284 of the cargo housing 128. The louvers 286 and 288 further assist the flow of air to the region of space immediately behind the rear end of the cargo housing 128.

A spoiler 290 is formed in the top surface of the cargo housing 128 near the top of the rear access 280. The spoiler 290 is in the form of a channel having a triangular cross section and extending widthwise along the top of the rear end of the cargo housing 128. The spoiler 290 creates a downward force on the rear end of the cargo housing 128 and reduces the possibility of fish-tailing and/or jack-knifing on slippery roads.

The panels 296 and 298 allow access to the wheels 130 and 132 for service and maintenance. The panels 296 and 298 are mirror images of one another, so only the panel 296 is described in detail. The panel 296 has an attachment mechanism with a mal piece 342 and corresponding female piece 340. The attachment mechanism can be interlocked to hold the panel 296 over the back wheels 130 and 132 while someone can work on the back wheels 130 and 132. The panel 296 utilizes a piano hinge that allows the panel 296 to swing up and mate the male 342 and female 340 pieces together. The attachment mechanism can also be separated by hand, thereby allowing the panel 296 to swing back over the wheels 132 and 130.

A framework 308 hangs below the floor of the cargo housing 128. The framework 308 may optionally support a step 310 to aid personnel in climbing into the cargo housing 128. The framework 308 includes a second spoiler 312 which extends, substantially the width of the rear end of the cargo housing 128. The forward edge of the spoiler 312 is lower than the rear edge of the spoiler 312, and the spoiler 312 scoops the air passing between the rear wheels of the trailer 114 and directs this air to the space immediately behind the rear access 280 to further reduce the suction drag created at the rear of the trailer 114.

The spoiler 312 provides additional downward force on the rear of the trailer 114 giving even better traction to the rear wheels 130 and 132. Furthermore, louvers 314 and 316 are provided on either side of the framework 308 which are essentially extensions of the louvers 286 and 288, respectively. The louvers 314 and 316 direct air to the space immediately behind the rear access 280 and help to further reduce the suction drag created at the rear of the trailer 114.

While the invention has been described with references to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. An aerodynamic guiding arrangement for a vehicle, said arrangement comprising:
   a forward gap enclosure with an upper element and a lower element, said gap enclosure being configured to be positioned and attached proximate a forward end of the vehicle; and
   a gap closure mechanism for automatically moving the forward gap enclosure from an open position to a closed position, and from a closed position to an open position, based on speed of the vehicle.

2. The guiding arrangement according to claim 1, wherein said upper element has a full length configured to extend from a position proximate a height of inflated front wheels of the vehicle to a top of the vehicle, and is configured to wrap about the top of the vehicle to approximately a height of inflated front wheels on an opposite side of the vehicle;

and wherein said lower element is configured to cover the front wheels when the vehicle exceeds a predetermined speed.

3. The guiding arrangement according to claim 2, wherein said gap closure mechanism comprises pivoting arms and a valve arrangement including a smart valve attached to two solenoid valves, said forward gap closure mechanism being attached to the upper element, wherein one of the solenoid valves opens an air valve that closes the gap enclosure when the vehicle exceeds the predetermined speed, and the other valve opens the forward gap enclosure when the vehicle obtains a speed below the predetermined speed.

4. The guiding arrangement according to claim 3, further comprising a rubber extrusion having a predetermined width, said rubber extrusion extending along the full length of the upper element, said rubber extrusion being configured to become forced down on sides and top of the vehicle when the vehicle exceeds the predetermined speed.

5. The guiding arrangement according to claim 4, further comprising a rearward gap enclosure with a pivotal element, said rearward gap enclosure being positioned proximate a rearward end of the vehicle, said pivotal element being configured to cover rear wheels of the vehicle when the vehicle exceeds the predetermined speed.

6. The guiding arrangement according to claim 5, in combination with a vehicle, said vehicle being a tractor and trailer rig with a tractor and a trailer.

7. The guiding arrangement according to claim 6, said tractor and trailer rig comprising a spoiler extending along a length of the upper element.

8. The guiding arrangement according to claim 6, said trailer comprising a spoiler extending along a length proximate a rearward portion of the trailer.

9. The guiding arrangement according to claim 6, said trailer comprising at least one rear door with a scoop spoiler built in the at least one rear door.

* * * * *